US010868300B2

(12) United States Patent
Hong et al.

(10) Patent No.: US 10,868,300 B2
(45) Date of Patent: Dec. 15, 2020

(54) POSITIVE ACTIVE MATERIAL FOR RECHARGEABLE LITHIUM BATTERY, METHOD OF PREPARING SAME, AND RECHARGEABLE LITHIUM BATTERY INCLUDING THE SAME

(71) Applicant: SAMSUNG SDI CO., LTD., Yongin-si (KR)

(72) Inventors: Ming-Zi Hong, Yongin-si (KR); Do-Hyung Park, Yongin-si (KR); Seon-Young Kwon, Yongin-si (KR); Joong-Ho Moon, Yongin-si (KR); Ji-Hyun Kim, Yongin-si (KR); Han-Eol Park, Yongin-si (KR); Min-Han Kim, Yongin-si (KR); Myong-A Woo, Yongin-si (KR); Ki-Hyun Kim, Yongin-si (KR); Jong-Seo Choi, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 253 days.

(21) Appl. No.: 14/281,678

(22) Filed: May 19, 2014

(65) Prior Publication Data
US 2015/0147651 A1 May 28, 2015

(30) Foreign Application Priority Data

Nov. 27, 2013 (KR) ........................ 10-2013-0145667

(51) Int. Cl.
*H01M 4/36* (2006.01)
*H01M 4/04* (2006.01)
(Continued)

(52) U.S. Cl.
CPC ......... *H01M 4/366* (2013.01); *H01M 4/0416* (2013.01); *H01M 4/0471* (2013.01);
(Continued)

(58) Field of Classification Search
CPC ..................................................... H01M 4/366
See application file for complete search history.

(56) References Cited

U.S. PATENT DOCUMENTS 8,366,968 B2   2/2013   Suzuki et al.
2002/0086210 A1*  7/2002   Naruoka ............... C01G 51/42
                                                               429/223
(Continued)

FOREIGN PATENT DOCUMENTS

CN           1711660 A      12/2005
CN         101675547 A       3/2010
(Continued)

OTHER PUBLICATIONS

Miao, Xiaowei et al. "Li2ZrO3-Coated 0.4Li2MnO3.0.6LiNi1/3Co1/3Mn1/3O2 for High Performance Cathode Material in Lithium-Ion Battery". Journal of Power Sources, vol. 264, 2014, pp. 147-154. Elsevier BV, doi:10.1016/j.jpowsour.2014.04.068. (Year: 2014).*

(Continued)

*Primary Examiner* — Robert S Carrico
(74) *Attorney, Agent, or Firm* — Lewis Roca Rothgerber Christie LLP (57) ABSTRACT

A positive active material for a rechargeable lithium battery including a core including at least one selected from a nickel-based composite oxide represented by Chemical Formula 1 or a lithium manganese oxide represented by Chemical Formula 2; and a coating layer on a surface of the core and including a lithium metal oxide represented by Chemical Formula 3, the positive active material having a peak at a 2θ value of about 19° to about 22° and another peak at a 2θ value of about 40° to about 45° in an X-ray diffraction pattern using a CuKα ray, is disclosed. A method of preparing the same, and a rechargeable lithium battery including the same, are also disclosed.

(Continued)

$$\text{LiNi}_x\text{Co}_y\text{Mn}_{1-x-y}\text{O}_2 \quad \text{Chemical Formula 1}$$

$$\text{Li}_a\text{Mn}_b\text{O}_c \quad \text{Chemical Formula 2}$$

$$\text{Li}_2\text{MO}_3 \quad \text{Chemical Formula 3}$$

In Chemical Formulae 1 to 3, x, y, a, b, c, and M are the same as in the detailed description.

5 Claims, 6 Drawing Sheets

(51) Int. Cl.
  *H01M 4/525* (2010.01)
  *H01M 4/485* (2010.01)
  *H01M 4/505* (2010.01)
(52) U.S. Cl.
  CPC .......... *H01M 4/485* (2013.01); *H01M 4/505* (2013.01); *H01M 4/525* (2013.01)

(56) References Cited

U.S. PATENT DOCUMENTS

| | | | |
|---|---|---|---|
| 2004/0201948 A1 | 10/2004 | Hosoya et al. | |
| 2004/0229123 A1* | 11/2004 | Takahashi | H01M 4/131 429/231.1 |
| 2004/0258836 A1 | 12/2004 | Besenhard et al. | |
| 2005/0221180 A1* | 10/2005 | Shimura | H01M 4/131 429/223 |
| 2009/0155694 A1 | 6/2009 | Park | |
| 2011/0033749 A1 | 2/2011 | Uchida et al. | |
| 2014/0065298 A1 | 3/2014 | Yanagisawa et al. | |
| 2014/0087270 A1* | 3/2014 | Yoshida | H01M 4/485 429/304 |

FOREIGN PATENT DOCUMENTS

| | | | | |
|---|---|---|---|---|
| CN | 103247797 A | | 8/2013 | |
| CN | 104505500 A | * | 4/2015 | |
| EP | 1463132 A2 | | 9/2004 | |
| JP | 07320785 A | * | 12/1995 | |
| JP | 2002289261 A | * | 10/2002 | ........ H01M 10/0525 |
| JP | 2006-202702 | | 8/2006 | |
| JP | 2009-152197 | | 7/2009 | |
| JP | 2010-277929 | | 12/2010 | |
| JP | 2012-234648 | | 11/2012 | |
| JP | WO 2012146961 A1 | * | 11/2012 | ........... C01G 23/005 |
| JP | 5193189 B2 | | 5/2013 | |
| KR | 10-0734225 | | 7/2007 | |
| KR | 10-0743982 | | 8/2007 | |
| KR | 10-2011-0063335 | | 6/2011 | |
| WO | WO 2012/026561 A2 | | 3/2012 | |
| WO | WO 2012/146961 A1 | | 11/2012 | |
| WO | WO-2012160698 A1 | * | 11/2012 | ............ H01M 4/485 |

OTHER PUBLICATIONS

Ni, Jiangfeng et al. "Improved Electrochemical Performance of Layered LiNi0.4Co0.2Mn0.4O2 Via Li2ZrO3 Coating". Electrochimica Acta, vol. 53, No. 7, 2008, pp. 3075-3083. Elsevier BV, doi:10.1016/j.electacta.2007.11.026. (Year: 2007).*
Wang, Chunguang et al. "Li2ZrO3 Coated LiNi1/3Co1/3Mn1/3O2 for High Performance Cathode Material in Lithium Batteries". Electrochimica Acta, vol. 119, 2014, pp. 236-242. Elsevier BV, doi:10.1016/j.electacta.2013.12.038. (Year: 2013).*
Yi, Xin et al. "Effective Enhancement of Electrochemical Performance for Spherical Spinel LiMn2O4 via Li Ion Conductive Li2ZrO3 Coating". Electrochimica Acta, vol. 134, 2014, pp. 143-149. Elsevier BV, doi:10.1016/j.electacta.2014.04.148. (Year: 2014).*
Machine Translation of JP 2006-202702 A (Year: 2002).*
Machine translation of JP 07-320785 A (Year: 1995).*
Korean Patent Abstracts Publication No. 10-2007-0060784 A, dated Jun. 13, 2007, for KR 10-0734225, 2 pages.
Thackeray, M.M. et al., "ZrO2- and Li2ZrO3-stabilized spinel and layered electrodes for lithium batteries", Electrochemistry Communications, Aug. 9, 2003, pp. 752-758, vol. 5.
EPO Search Report dated Mar. 31, 2015, for corresponding European Patent application 14176431.6, (7 pages).
English machine translation of Japanese Publication 2006-202702 dated Aug. 3, 2006, listed above, (18 pages).
EPO Office Action dated Oct. 7, 2016, for corresponding European Patent Application. No. 14176431.6 (4 pages).
Ni et al., "Improved electrochemical performance of layered LiNi$_{0.4}$Co$_{0.2}$Mn$_{0.4}$O$_2$ via Li$_2$ZrO$_3$ coating," Electrochimica Acta 53, 2008, pp. 3075-3083.
KIPO Office Action dated Mar. 31, 2017, for corresponding Korean Patent Application No. 10-2013-0145667 (7 pages).
EPO Office Action dated Mar. 28, 2018, for corresponding European Patent Application No. 14176431.6 (6 pages).
EPO Office Action dated Sep. 5, 2017, for corresponding European Patent Application No. 14176431.6 (6 pages).
Chinese Office Action dated Mar. 2, 2018, for corresponding Chinese Patent Application No. 201410483552.2, citing the references listed above (11 pages).
Chinese Office Action, with English translation, dated Nov. 27, 2018, for corresponding Chinese Patent Application No. 201410483552.2 (31 pages).
EPO Office Action dated Aug. 23, 2018, for corresponding European Patent Application No. 14176431.6 (4 pages).
Chinese Office Action, dated Jun. 17, 2019, for corresponding China Patent Application No. 201410483552.2 (27 pages).

* cited by examiner

POSITIVE ACTIVE MATERIAL FOR RECHARGEABLE LITHIUM BATTERY, METHOD OF PREPARING SAME, AND RECHARGEABLE LITHIUM BATTERY INCLUDING THE SAME

CROSS-REFERENCE TO RELATED APPLICATION

This application claims priority to and the benefit of Korean Patent Application No. 10-2013-0145667, filed in the Korean Intellectual Property Office on Nov. 27, 2013, the entire content of which is incorporated herein by reference.

BACKGROUND

1. Field

Aspects of embodiments of the present disclosure are directed toward a positive active material for a rechargeable lithium battery, a method of preparing the same, and a rechargeable lithium battery including the same.

2. Description of the Related Art

A rechargeable lithium battery has drawn attention as a power source for small, portable electronic devices. The rechargeable lithium battery includes an organic electrolyte solution and has a high discharge voltage that is two times or more greater than that of a conventional battery that includes an alkali aqueous solution. Accordingly, such a battery has a high energy density.

Such a rechargeable lithium battery can be manufactured by injecting an electrolyte into an electrode assembly, which includes a positive electrode including a positive active material capable of intercalating/deintercalating lithium ions and a negative electrode including a negative active material capable of intercalating/deintercalating lithium ions.

Although $LiCoO_2$ is widely used as a positive active material, other materials are actively being researched as replacements for $LiCoO_2$ due to the limits of capacity and safety problems thereof.

For example, because $LiCoO_2$ has stable electrochemical characteristics, $LiNiO_2$ has a high capacity, and $LiMnO_2$ has excellent thermal stability and low price, a Co—Ni—Mn ternary lithium metal composite oxide has been investigated in an effort to combine the foregoing merits.

However, although the foregoing ternary lithium metal composite oxide has a high capacity, it has problems with respect to thermal safety and cycle-life characteristics.

SUMMARY

One aspect according to an embodiment is directed toward providing a positive active material for a rechargeable lithium battery having high capacity and improved thermal safety and cycle-life characteristics.

Another aspect according to an embodiment is directed toward providing a method of preparing the positive active material for a rechargeable lithium battery.

Yet another aspect according to an embodiment is directed toward providing a rechargeable lithium battery including the positive active material for a rechargeable lithium battery.

According to one embodiment, a positive active material for a rechargeable lithium battery includes a core including at least one selected from a nickel-based composite oxide represented by the following Chemical Formula 1 or a lithium manganese oxide represented by the following Chemical Formula 2; and a coating layer on a surface of the core and including a lithium metal oxide represented by the following Chemical Formula 3, where the positive active material has a peak at a 2θ value of about 19° to about 22° and another peak at a 2θ value of about 40° to about 45° in an X-ray diffraction pattern using a CuKα ray.

$LiNi_xCo_yMn_{1-x-y}O_2$     Chemical Formula 1

In the above Chemical Formula 1, 0.1≤x≤0.8, and 0.1≤y≤0.8.

$Li_aMn_bO_c$     Chemical Formula 2

In the above Chemical Formula 2, 1≤a≤2, 1≤b≤2, and 2≤c≤4.

$Li_2MO_3$     Chemical Formula 3

In the above Chemical Formula 3, M is at least one tetravalent element selected from Zr or Ti.

The positive active material may have an intensity ratio of the peak at a 2θ value of about 19° to about 22° to the other peak at a 2θ value of about 40° to about 45° of about 2.0 to about 3.0. The positive active material may have an intensity ratio of the peak at a 2θ value of about 19° to about 22° to the other peak at a 2θ value of about 40° to about 45° of about 2.0 to about 2.5.

The positive active material may include about 90 wt % to about 99.9 wt % of the core and about 0.1 wt % to about 10 wt % of the coating layer.

According to another embodiment, a method of preparing a positive active material for a rechargeable lithium battery includes: mixing at least one core material selected from a nickel-based composite oxide represented by the above Chemical Formula 1 or a lithium manganese oxide represented by the above Chemical Formula 2 and a solution including a salt including at least one tetravalent element selected from Zr or Ti to form a mixture; and heat-treating the mixture to coat a surface of the core material with a lithium metal oxide represented by the above Chemical Formula 3.

According to yet another embodiment, a method of preparing a positive active material for a rechargeable lithium battery includes: mixing a salt including at least one tetravalent element selected from Zr or Ti and a first solvent to form a salt solution; mixing chelating agent and a second solvent to form a chelating agent solution; mixing the salt solution and the chelating agent solution to form a first mixed solution; mixing the first mixed solution and a homogenizer to form a second mixed solution; mixing at least one core material selected from a nickel-based composite oxide represented by the above Chemical Formula 1 or a lithium manganese oxide represented by the above Chemical Formula 2 and the second mixed solution to form a mixture; and heat-treating the mixture to coat a surface of the core material with a lithium metal oxide represented by the above Chemical Formula 3.

The salt including the tetravalent element may include at least one selected from $ZrO(NO_3)_2 \cdot rH_2O$ (0≤r≤5), $Zr(NO_3)_2 \cdot 5H_2O$, $Zr(SO_4)_2$, or $Zr(SO_4)_2 \cdot 4H_2O$.

The salt including the tetravalent element may be present in the salt solution in an amount of about 0.001 parts by mole to about 10 parts by mole based on 100 parts by mole of the core material.

The solution (e.g., the salt solution) including the salt including the tetravalent element may be an aqueous solution or an alcohol solution.

The first solvent and second solvent may each independently include water, alcohol, or a combination thereof.

The heat-treating may be performed at a temperature of about 350° C. to about 1000° C.

The heat-treating may be performed under an air atmosphere or an oxygen atmosphere.

Another embodiment provides a rechargeable lithium battery including a positive electrode including the positive active material; a negative electrode; and an electrolyte.

Other embodiments are included in the following detailed description.

A rechargeable lithium battery having high capacity, and improved thermal safety and cycle-life characteristics may be realized.

BRIEF DESCRIPTION OF THE DRAWINGS

The accompanying drawings, together with the specification, illustrate embodiments of the present disclosure, and, together with the description, serve to explain the principles of the present disclosure.

DETAILED DESCRIPTION

Hereinafter, certain embodiments are shown and described, by way of illustration. However, these embodiments are exemplary, and this disclosure is not limited thereto. As those skilled in the art would recognize, the invention may be embodied in many different forms. Also, in the context of the present application, when a first element is referred to as being "on" a second element, it can be directly on the second element or be indirectly on the second element with one or more intervening elements interposed therebetween. Like reference numerals designate like elements throughout the specification.

A positive active material for a rechargeable lithium battery according to one embodiment includes a core and a coating layer at (e.g., positioned at) a surface of the core. The core may include at least one selected from a nickel-based composite oxide represented by the following Chemical Formula 1 or a lithium manganese oxide represented by the following Chemical Formula 2. The coating layer may include a lithium metal oxide represented by the following Chemical Formula 3.

$LiNi_xCo_yMn_{1-x-y}O_2$ <span style="float:right">Chemical Formula 1</span>

In the above Chemical Formula 1, 0.1≤x≤0.8, and 0.1≤y≤0.8.

$Li_aMn_bO_c$ <span style="float:right">Chemical Formula 2</span>

In the above Chemical Formula 2, 1≤a≤2, 1≤b≤2, and 2≤c≤4.

$Li_2MO_3$ <span style="float:right">Chemical Formula 3</span>

In the above Chemical Formula 3, M is at least one tetravalent element selected from Zr or Ti.

When the nickel-based composite oxide represented by the above Chemical Formula 1 is included in a core, a Co—Ni—Mn three component-based oxide having high capacity may be obtained. In some embodiments, the lithium metal oxide represented by the above Chemical Formula 3 is coated on the surface of the foregoing three component-based oxide (e.g., on the surface of the core including the nickel-based composite oxide represented by the above Chemical Formula 1). The coated three component-based oxide may be included in a rechargeable lithium battery to achieve excellent thermal safety and cycle-life characteristics, as well as high capacity.

When a lithium manganese oxide represented by the above Chemical Formula 2 is included in a core, high performance may be obtained. In some embodiments, the lithium metal oxide represented by the above Chemical Formula 3 is coated on a surface of the lithium manganese oxide (e.g., on the surface of the core including the lithium manganese oxide represented by the above Chemical Formula 2). The coated lithium manganese oxide may be included in a rechargeable lithium battery to achieve excellent thermal safety and cycle-life characteristics, as well as high capacity.

The core may include the nickel-based composite oxide and the lithium manganese oxide together, but the present disclosure is not limited thereto. Herein, the core is coated with the lithium metal oxide represented by the above Chemical Formula 3 on the surface of the core and thus, may improve storage characteristics, thermal safety, and cycle-life characteristics of a rechargeable lithium battery.

The positive active material having the core coated with the lithium metal oxide represented by the above Chemical Formula 3 on the surface may have a peak at a 2θ value of about 19° to about 22° and another peak at a 2θ of about 40° to about 45° in a XRD pattern using a CuKα ray. For example, the peak may be at a 2θ value of about 20° to about 21° and the other peak may be at a 2θ value of about 42° to about 43°. The peaks at the respective 2θ values indicate (or show) that a phase of the lithium metal oxide represented by the above Chemical Formula 3 is present, and the XRD pattern corresponds to (or shows) a structure in which the lithium metal oxide is coated on the surface of the core. When the lithium metal oxide is coated on the surface of the core, a rechargeable lithium battery having high capacity and excellent thermal safety and cycle-life characteristics may be realized.

In some embodiments, a positive active material obtained by coating the lithium metal oxide represented by the above Chemical Formula 3 on the surface of the core may have an intensity ratio of the peak at a 2θ value of about 19° to about 22° to the other peak at a 2θ value of about 40° to about 45° of about 2.0 to about 3.0 and, for example, about 2.0 to about 2.5. When the positive active material has a peak intensity ratio according to either of the foregoing ranges, a rechargeable lithium battery having high capacity and excellent thermal safety and cycle-life characteristic may be realized.

The positive active material may include about 90 wt % to about 99.9 wt % of the core and about 0.1 wt % to about 10 wt % of the coating layer, and specifically about 95 wt % to about 99 wt % of the core and about 1 wt % to about 5 wt % of the coating layer. When a rechargeable lithium battery includes a positive active material having a composition according to any of the foregoing ranges, the rechargeable lithium battery may have high capacity and excellent thermal safety and cycle-life characteristics.

The positive active material may be prepared according to the two following methods.

A first method includes adding at least one core material selected from a nickel-based composite oxide represented by the above Chemical Formula 1 or a lithium manganese oxide represented by the above Chemical Formula 2 to a solution including a salt including at least one tetravalent element selected from Zr or Ti to obtain a mixture, and then heat-treating the mixture to coat the surface of the core material with the lithium metal oxide represented by the above Chemical Formula 3.

A second method includes a sol-gel method using (utilizing) a salt including at least one tetravalent element selected from Zr or Ti. In some embodiments, the method includes coating a surface of at least one core material selected from a nickel-based composite oxide represented by the above Chemical Formula 1 or a lithium manganese oxide represented by the above Chemical Formula 2 with the tetravalent element, and then heat-treating the core material coated with the tetravalent element to coat the surface of the core material with the lithium metal oxide represented by the above Chemical Formula 3.

For example, the second method may be illustrated as follows, but the present disclosure is not limited thereto.

A salt solution is obtained by mixing a salt including at least one tetravalent element selected from Zr or Ti and a first solvent to form a mixture, and agitating the mixture at room temperature. In addition, a chelating agent solution is obtained by mixing a chelating agent and a second solvent to form a mixture and agitating the mixture. Herein, the first and second solvents may each be at least one selected from water or alcohol. The alcohol may be methanol, ethanol, propanol, butanol, or a combination thereof. In addition, a ratio of moles of the citric acid to moles of the salt including the tetravalent element may be about 0.5 to 5. The salt solution is mixed with the chelating agent solution to form a mixture, and the mixture is agitated for about 10 minutes to about 30 minutes to obtain a first mixed solution. The first mixed solution is mixed with a homogenizer to obtain a second mixed solution. The mixing with the homogeniezer may be performed for 5 minutes to 30 minutes, and the amount of the homogenizer may be 0.5 time to 5 times based on the moles of an ion of the tetravalent element.

The chelating agent is a material forming a chelating compound by coordinating a metal ion, and may be citric acid, EDTA (ethylenediamine tetraacetic acid), EGTA (ethylene glycol tetraacetic acid), ethylene diamine, auxine, or o-phenanthroline. The homogenizer polymerizes with the chelating agent during a heat-treatment, thereby preventing agglomeration of metal ions chelated. An example of the homogenizer may include polyols such as ethylene glycol.

At least one core material selected from a nickel-based composite oxide represented by the above Chemical Formula 1 or a lithium manganese oxide represented by the above Chemical Formula 2 are added to the second mixed solution to form a mixture, and the obtained mixture is agitated at a temperature greater than or equal to about 80° C., for example, a temperature of 80° C. to 100° C., until moisture of the resultant mixture is completely (or substantially completely) evaporated. The resultant mixture is heat-treated to obtain a positive active material including the core material and the lithium metal oxide represented by the above Chemical Formula 3 coated on the surface of the core material.

The salt including the tetravalent element may include at least one selected from $ZrO(NO_3)_2 \cdot rH_2O (0 \leq r \leq 5)$, $Zr(NO_3)_2 \cdot 5H_2O$, $Zr(SO_4)_2$, or $Zr(SO_4)_2 \cdot 4H_2O$.

The salt including the tetravalent element may be included in the salt solution in an amount of about 0.001 part by mole to about 10 parts by mole, and, for example, about 1 part by mole to about 5 parts by mole based on 100 parts by mole of the core material. When the salt including a tetravalent element is included within either of the foregoing ranges, capacity, thermal stability, and cycle-life characteristics may be improved.

The salt solution including the salt including the tetravalent element may be an aqueous solution or an alcohol solution. The alcohol solution may include a solvent including a C1 to C5 alkanol.

The heat-treating may be performed at a temperature of about 350° C. to about 1000° C., and, for example, about 600° C. to about 800° C., for about 5 hours to about 10 hours. The heat-treating may be performed under an air atmosphere or an oxygen atmosphere. When the heat-treatment is performed within the either of the foregoing temperature ranges, a product including the core material coated with the lithium metal oxide represented by the above Chemical Formula 3 on the surface may be obtained. Accordingly, a rechargeable lithium battery having high capacity and excellent thermal safety and cycle-life characteristic may be realized.

Hereinafter, a rechargeable lithium battery including the positive active material is illustrated with reference to FIG. 1.

Figure 1:
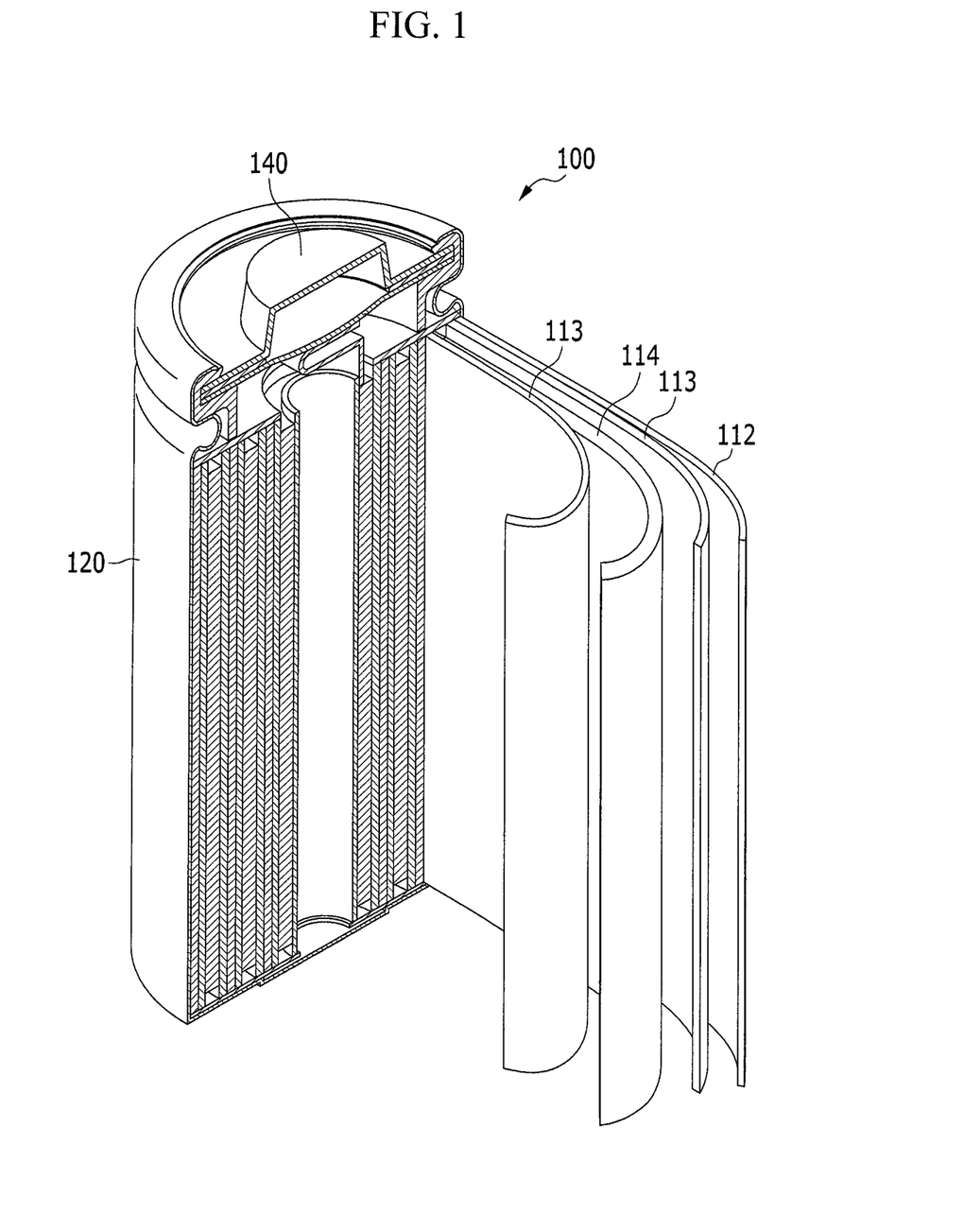
FIG. 1 is a schematic perspective view of a rechargeable lithium battery according to one embodiment.

FIG. 1 is a schematic perspective view showing the rechargeable lithium battery according to one embodiment.

Referring to FIG. 1, a rechargeable lithium battery 100 according to one embodiment includes a positive electrode 114, a negative electrode 112 facing the positive electrode 114, a separator 113 between the negative electrode 112 and the positive electrode 114, an electrolyte impregnating the separator 113, a battery case 120, and a sealing member 140 sealing the battery case 120.

In some embodiments, the positive electrode 114 includes a current collector, and a positive active material composition on the current collector. The positive active material layer includes a positive active material, a binder, and, optionally, a conductive material.

The current collector may include Al, but the current collector is not limited thereto.

The positive active material is the same as described above. When the positive active material is used, generation of oxygen gas during charge and discharge, and a reaction of the positive active material with an electrolyte may be suppressed (or reduced) and thus, a rechargeable lithium battery having high electrical conductivity and excellent thermal stability and performance may be realized.

The binder improves binding properties of positive active material particles with one another and with a current collector and examples of the binder may include polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but the binder is not limited thereto.

The conductive material improves conductivity of an electrode. Any suitable electrically conductive material may be used as a conductive material, unless it causes a chemical change in the rechargeable lithium battery. Examples thereof may include one or more of natural graphite, artificial graphite, carbon black, acetylene black, ketjen black, a carbon fiber, a metal powder, a metal fiber, and the like of copper, nickel, aluminum, silver, and the like, a conductive material such as a polyphenylene derivative and the like, but the conductive material is not limited thereto.

The negative electrode 112 includes a negative current collector and a negative active material composition on the negative current collector.

The negative current collector may include a copper foil, but the negative current collector is not limited thereto.

The negative active material composition may include a negative active material, a binder, and, optionally, a conductive material.

The negative active material may include a material that reversibly intercalates/deintercalates lithium ions, a lithium metal, a lithium metal alloy, a material capable of doping/dedoping lithium, a transition metal oxide, or a combination thereof.

The material that reversibly intercalates/deintercalates lithium ions may be a carbon material. The carbon material may be any suitable carbon-based negative active material generally used in a lithium ion rechargeable battery. Examples of the carbon material include crystalline carbon, amorphous carbon, and mixtures thereof, but the carbon material is not limited thereto. The crystalline carbon may be non-shaped, or sheet, flake, spherical, or fiber shaped natural graphite or artificial graphite. The amorphous carbon may be a soft carbon, a hard carbon, a mesophase pitch carbonized product, fired coke, and the like.

Examples of the lithium metal alloy include lithium and a metal selected from Na, K, Rb, Cs, Fr, Be, Mg, Ca, Sr, Si, Sb, Pb, In, Zn, Ba, Ra, Ge, Al, or Sn, but the lithium metal alloy is not limited thereto.

Examples of the material capable of doping/dedoping lithium include a Si-based compound such as Si, $SiO_x$ (0<x<2), a Si—C composite, a Si-Q alloy (wherein Q is an alkali metal, an alkaline-earth metal, Group 13 to 16 elements, a transition element, a rare earth element, or a combination thereof, and not Si), a Si—C composite, or a combination thereof; a Sn-based compound such as Sn, $SnO_2$, a Sn—C composite, a Sn—R alloy (wherein R is an alkali metal, an alkaline-earth metal, Group 13 to 16 elements, a transition element, a rare earth element, or a combination thereof, and not Sn), or a combination thereof; or a combination thereof, but the material capable of doping/dedoping lithium is not limited thereto. At least one of these materials may be mixed with $SiO_2$. The elements Q and R may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, or a combination thereof.

Examples of the transition metal oxide include vanadium oxide, lithium vanadium oxide, and the like, but the transition metal oxide is not limited thereto.

The binder improves binding properties of negative active material particles with one another and with a current collector, and examples thereof may include polyvinyl alcohol, carboxylmethyl cellulose, hydroxypropyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but the binder is not limited thereto.

The conductive material improves conductivity of an electrode. Any suitable electrically conductive material may be used as a conductive material, unless it causes a chemical change in the rechargeable lithium battery. Examples thereof may include a carbon-based material such as natural graphite, artificial graphite, carbon black, acetylene black, ketjen black, a carbon fiber and the like; a metal-based material such as a metal powder or a metal fiber and the like of copper, nickel, aluminum, silver, and the like; a conductive polymer such as a polyphenylene derivative and the like; or a mixture thereof, but the conductive material is not limited thereto.

The negative electrode 112 and the positive electrode 114 may each be manufactured by mixing the respective active material, conductive material and binder in a solvent to prepare an active material composition, and coating a current collector with the composition.

The electrode manufacturing method should be apparent to those of skill in the art, and thus, the method is not described in more detail here. The solvent can include N-methylpyrrolidone and the like, but the solvent is not limited thereto.

The electrolyte includes a non-aqueous organic solvent and a lithium salt.

The non-aqueous organic solvent serves as a medium for transmitting ions taking part in the electrochemical reaction of the rechargeable lithium battery. The non-aqueous organic solvent may be selected from a carbonate-based, ester-based, ether-based, ketone-based, alcohol-based, or aprotic solvent, but the non-aqueous organic solvent is not limited thereto.

The carbonate-based solvent may include, for example, dimethyl carbonate (DMC), diethyl carbonate (DEC), dipropyl carbonate (DPC), methylpropyl carbonate (MPC), ethylpropyl carbonate (EPC), ethylmethyl carbonate (EMC), ethylene carbonate (EC), propylene carbonate (PC), butylene carbonate (BC), and the like, but the carbonate-based solvent is not limited thereto.

For example, when linear carbonate compounds and cyclic carbonate compounds are mixed, an organic solvent having high dielectric constant and low viscosity may be provided. In some embodiments, the cyclic carbonate and the linear carbonate are mixed together in a volume ratio of about 1:1 to about 1:9.

Examples of the ester-based solvent may include n-methylacetate, n-ethylacetate, n-propylacetate, dimethylacetate, methylpropionate, ethylpropionate, γ-butyrolactone, decanolide, valerolactone, mevalonolactone, caprolactone, or the like, but the ester-based solvent is not limited thereto. Examples of the ether-based solvent include dibutyl ether, tetraglyme, diglyme, dimethoxyethane, 2-methyltetrahydrofuran, tetrahydrofuran, and the like, and examples of the ketone-based solvent include cyclohexanone, or the like, but the ether-based and ketone-based solvents are not limited thereto. Examples of the alcohol-based solvent include ethyl alcohol, isopropyl alcohol, or the like, but the alcohol-based solvent is not limited thereto.

The non-aqueous organic solvent may be used singularly or in a mixture. When the organic solvent is used in a mixture, the mixture ratio may be controlled in accordance with a suitable (or desirable) battery performance.

The non-aqueous electrolyte may further include an overcharge inhibitor additive such as ethylenecarbonate, pyrocarbonate, or the like.

The lithium salt is dissolved in the organic solvent, supplies lithium ions in the battery, generally facilitates operation of the rechargeable lithium battery, and improves lithium ion transportation between positive and negative electrodes therein.

Examples of the lithium salt may include $LiPF_6$, $LiBF_4$, $LiSbF_6$, $LiAsF_6$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2))$ (where x and y are natural numbers), LiCl, LiI, $LiB(C_2O_4)_2$ (lithium bis(oxalato)borate, LiBOB), or a combination thereof, as a supporting electrolytic salt, but the lithium salt is not limited thereto.

The lithium salt may be used (or be present) in a concentration of about 0.1 M to about 2.0 M. When the lithium salt is included within the above concentration range, an electrolyte may have excellent performance and lithium ion mobility due to suitable (or optimal) electrolyte conductivity and viscosity.

The separator 113 may include any suitable materials generally used in a lithium battery as long as the materials are capable of separating a negative electrode 112 from a positive electrode 114 and capable of providing a transporting passage for lithium ions. In other words, the separator 113 may be made of a material having a low resistance to ion transportation and an excellent impregnation with respect to an electrolyte. For example, the material may be selected from a glass fiber, polyester, TEFLON® (tetrafluoroethylene; TEFLON® is a registered trademark of E. I. du Pont de Nemours and Company), polyethylene, polypropylene, polytetrafluoroethylene (PTFE), or a combination thereof, but the separator is not limited thereto. The separator may have a form of a non-woven fabric or a woven fabric. For example, a polyolefin-based polymer separator such as polyethylene, polypropylene or the like is mainly used for a lithium ion battery. In order to ensure (or provide) heat resistance or mechanical strength, a coated separator including a ceramic component or a polymer material may be used. For example, the separator may have a mono-layered or multi-layered structure.

Hereinafter, embodiments are illustrated in more detail with reference to examples. These examples, however, should not in any sense be interpreted as limiting the scope of the present invention.

Furthermore, what is not described in this disclosure will be readily understood by those of skill in the art and, therefore, will not be described in more detail here.

Preparation of Positive Active Material

Example 1

An aqueous solution including $NiSO_4$ with a concentration of 2.4M, an aqueous solution including $CoSO_4$ with a concentration of 2.4M and an aqueous solution including $MnSO_4$ with a concentration of 2.4M were mixed in order to obtain a mole ratio of Ni:Co:Mn of 56:22:22 in a resulting mixture. An NaOH aqueous solution having a concentration of about 7.5 M and an $NH_4OH$ aqueous solution having a concentration of about 15 M were added thereto to form a mixture, and the mixture was continuously mixed in a co-precipitator. The mixture was co-precipitated at a pH of 11 for 8 hours at 40° C. and at a mixing speed of about 700 rpm to obtain a $(Ni_{0.56}Co_{0.22}Mn_{0.22})OH_2$ precursor. The precursor was washed with water, dried in a 120° C. oven, filtered, and then, mixed with $Li_2Co_3$ in a mole ratio of about 1:1 by using a mixer. The obtained mixture was put in a firing container, and fired at a rate of 2° C./min to 890° C. for about 10 hours to prepare a nickel-based composite oxide including $LiNi_{0.56}Co_{0.22}Mn_{0.22}O_2$.

A Zr salt aqueous solution was prepared by adding $ZrO(NO_3)_2 \cdot 5H_2O$ to distilled water to form a mixture and agitating the mixture at room temperature. A citric acid solution was prepared by adding a number of moles of citric acid that is twice that of the Zr salt to distilled water to form a mixture and agitating the mixture. The Zr salt aqueous solution and the citric acid solution were mixed and agitated for 20 minutes to prepare a first mixed solution. A number of moles of ethylene glycol that are the same (or substantially the same) as the number of moles of the first mixed solution was added to the first mixed solution, and the resultant mixture was agitated for 20 minutes to prepare a second mixed solution. The above $LiNi_{0.56}Co_{0.22}Mn_{0.22}O_2$ was added to the second mixed solution including the Zr salt to form a mixture, and the mixture was agitated at a temperature of 80° C. until moisture therein was completely (or substantially completely) evaporated. Herein, 1 part by mole of the $ZrO(NO_3)_2 \cdot 5H_2O$ was added to the mixture, based on 100 parts by mole of the $LiNi_{0.56}Co_{0.22}Mn_{0.22}O_2$. The resultant mixture was heat-treated at 700° C. for 10 hours under an air atmosphere to prepare $LiNi_{0.56}Co_{0.22}Mn_{0.22}O_2$ coated with $Li_2ZrO_3$ on a surface thereof as a positive active material. The positive active material included 99 wt % of $LiNi_{0.56}Co_{0.22}Mn_{0.22}O_2$ as a core and 1 wt % of $Li_2ZrO_3$ as a coating layer.

Example 2

A positive active material was prepared as in Example 1 except for using 5 parts by mole of the $ZrO(NO_3)_2 \cdot 5H_2O$, based on 100 parts by mole of the $LiNi_{0.56}Co_{0.22}Mn_{0.22}O_2$. The positive active material included 95 wt % of $LiNi_{0.56}Co_{0.22}Mn_{0.22}O_2$ as a core and 5 wt % of $Li_2ZrO_3$ as a coating layer.

Example 3

A positive active material was prepared as in Example 1 except for using ethanol instead of distilled water as a solvent during preparation of the Zr salt aqueous solution and citric acid solution. The positive active material included 99 wt % of $LiNi_{0.56}Co_{0.22}Mn_{0.22}O_2$ as a core and 1 wt % of $Li_2ZrO_3$ as a coating layer.

Example 4

A positive active material was prepared as in Example 3 except for using 5 parts by mole of the $ZrO(NO_3)_2 \cdot 5H_2O$, based on 100 parts by mole of the $LiNi_{0.56}Co_{0.22}Mn_{0.22}O_2$. The positive active material included 95 wt % of $LiNi_{0.56}Co_{0.22}Mn_{0.22}O_2$ as a core and 5 wt % of $Li_2ZrO_3$ as a coating layer.

Example 5

A positive active material was prepared as in Example 1 except for using 0.5 parts by mole of the $ZrO(NO_3)_2 \cdot 5H_2O$, based on 100 parts by mole of the $LiNi_{0.56}Co_{0.22}Mn_{0.22}O_2$. The positive active material included 99.5 wt % of $LiNi_{0.56}Co_{0.22}Mn_{0.22}O_2$ as a core and 0.5 wt % of $Li_2ZrO_3$ as a coating layer.

Example 6

A positive active material was prepared as in Example 1 except for using 1.5 parts by mole of the $ZrO(NO_3)_2 \cdot 5H_2O$, based on 100 parts by mole of the $LiNi_{0.56}Co_{0.22}Mn_{0.22}O_2$. The positive active material included 98.5 wt % of $LiNi_{0.56}Co_{0.22}Mn_{0.22}O_2$ as a core and 1.5 wt % of $Li_2ZrO_3$ as a coating layer.

Example 7

A positive active material was prepared as in Example 1 except for using $LiMn_2O_4$ instead of the $LiNi_{0.56}Co_{0.22}Mn_{0.22}O_2$. The positive active material included 99 wt % of $LiNi_{0.56}Co_{0.22}Mn_{0.22}O_2$ as a core and 1 wt % of $Li_2ZrO_3$ as a coating layer.

Comparative Example 1

A positive active material was prepared by heat-treating the $LiNi_{0.56}Co_{0.22}Mn_{0.22}O_2$ according to Example 1 at 700° C. for 10 hours under an air atmosphere.

Comparative Example 2

An aqueous solution including $NiSO_4$, $CoSO_4$ and $MnSO_4$ at a total concentration of about 2.4 M and a mole ratio of Ni:Co:Mn of 56:22:22 was prepared. An NaOH aqueous solution having a concentration of about 7.5 M and an $NH_4OH$ aqueous solution having a concentration of about 15 M were added thereto to form a mixture, and the mixture was continually mixed in a co-precipitator. The mixture was co-precipitated at a pH of 11 for 8 hours at 40° C. and at a mixing speed of about 700 rpm to obtain a $(Ni_{0.56}Co_{0.22}Mn_{0.22})OH_2$ precursor. The precursor was washed with water, dried in a 120° C. oven, filtered, and then, mixed with $Li_2Co_3$ in a mole ratio of about 1:1 by using a mixer. The obtained mixture was put in a firing container and fired at a rate of 2° C./min to 890° C. for about 30 hours to prepare a nickel-based composite oxide including $LiNi_{0.56}Co_{0.22}Mn_{0.22}O_2$. The prepared $LiNi_{0.56}Co_{0.22}Mn_{0.22}O_2$ was used as a positive active material.

Comparative Example 3

$LiMn_2O_4$ was used as a positive active material.
Evaluation 1: XRD Measurement of Positive Active Material X-ray diffraction analysis (XRD) of the positive active materials according to Examples 1 to 4 was measured, and the results are provided in the following FIG. 2.

Figure 2:
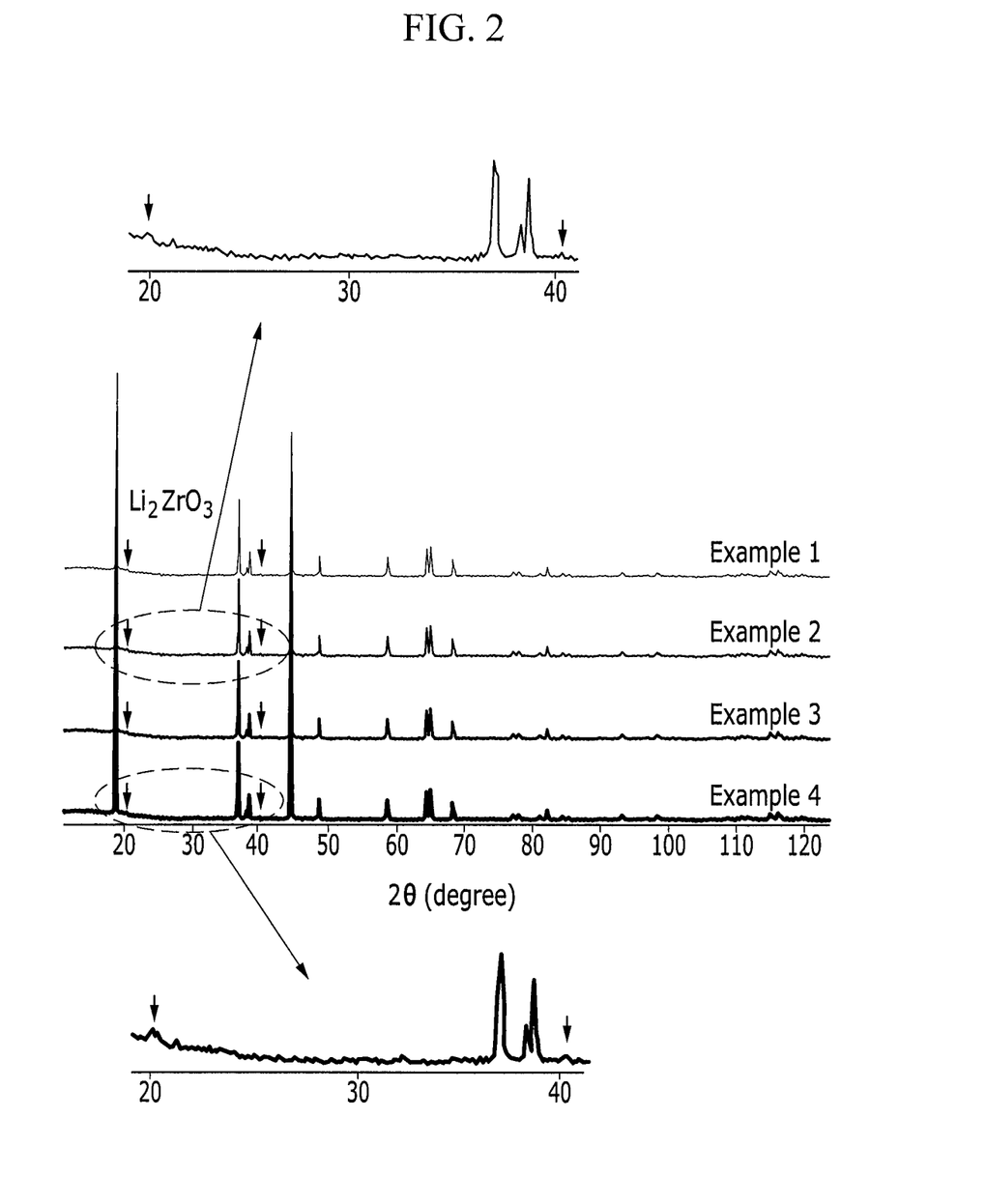
FIG. 2 is a graph showing X-ray diffraction analysis (XRD) of positive active materials according to Examples 1 to 4.

FIG. 2 is a graph showing X-ray diffraction analysis (XRD) of the positive active materials according to Examples 1 to 4. Referring to FIG. 2, the positive active materials according to Examples 2 and 4 each showed two main peaks of $Li_2ZrO_3$ at about 20.3° and about 42.5°. On the other hand, the positive active materials according to Examples 1 and 3 included $Li_2ZrO_3$ in a small amount and thus, showed peaks that were hardly observable with the naked eye in the XRD analysis shown in FIG. 2.

The positive active materials according to Examples 2 and 4 showed an intensity ratio of a peak at a 2θ value of about 20.3° to another peak at a 2θ value of about 42.5° of 2.17 when the ratio was calculated from the XRD graph shown in FIG. 2.

Evaluation 2: DSC Measurement of Positive Active Material

Figure 3:
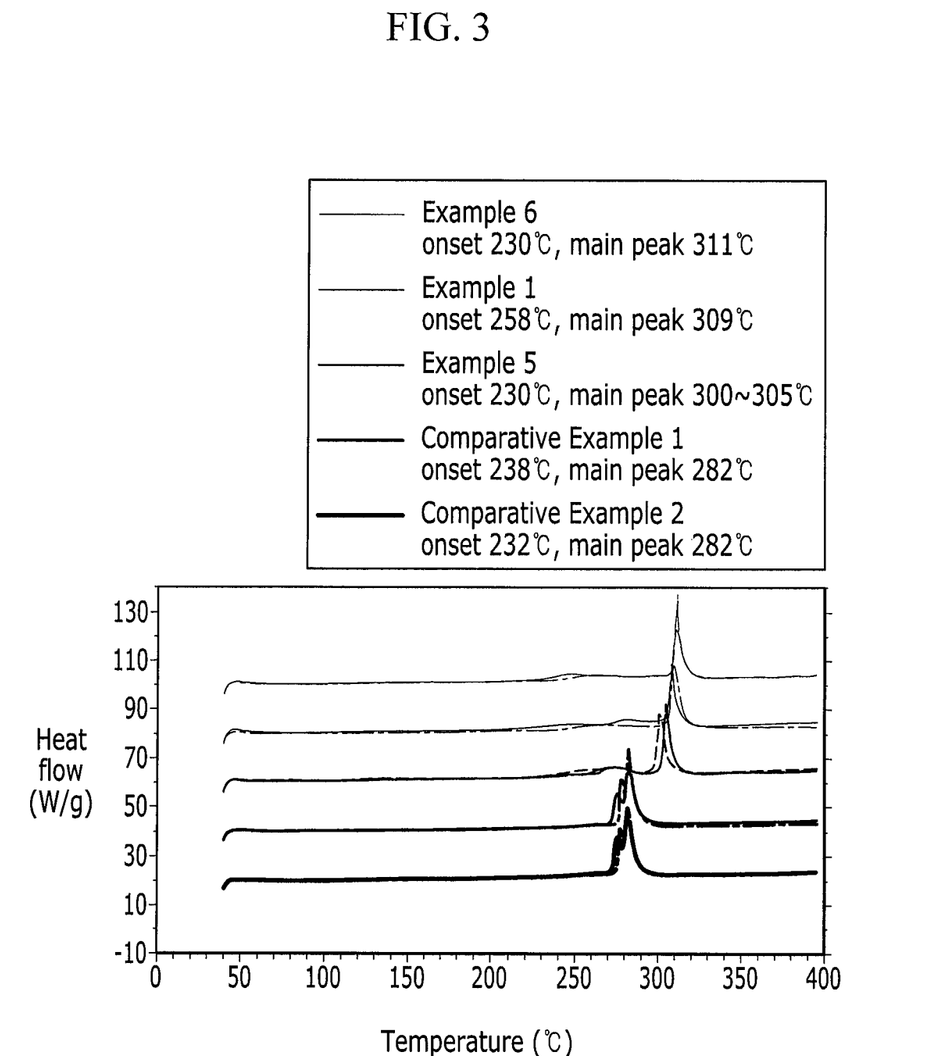
FIG. 3 is a graph showing DSC (differential scanning calorimetry) curves of positive active materials according to Examples 1, 5 and 6 and Comparative Examples 1 to 3.

DSC (differential scanning calorimetry) of the positive active materials according to Examples 1, 5, and 6 and Comparative Examples 1 and 2 was measured, and the results are shown in FIG. 3.

FIG. 3 is a graph showing DSC curves of the positive active materials according to Examples 1, 5, and 6 and Comparative Examples 1 to 3.

Referring to FIG. 3, Examples 1, 5, and 6, which included a nickel-based composite oxide coated with $Li_2ZrO_3$ as a positive active material, showed a main exothermic peak shifted toward a higher temperature and thus, exhibited sharply improved thermal safety as compared with Comparative Examples 1 and 2, which included a nickel-based composite oxide that was not coated with $Li_2ZrO_3$.
Evaluation 3: Transmission Electron Microscope (TEM) Analysis FIG. 4 is a series of transmission electron microscope (TEM) photographs showing the positive active material according to Example 5.

Figure 4:
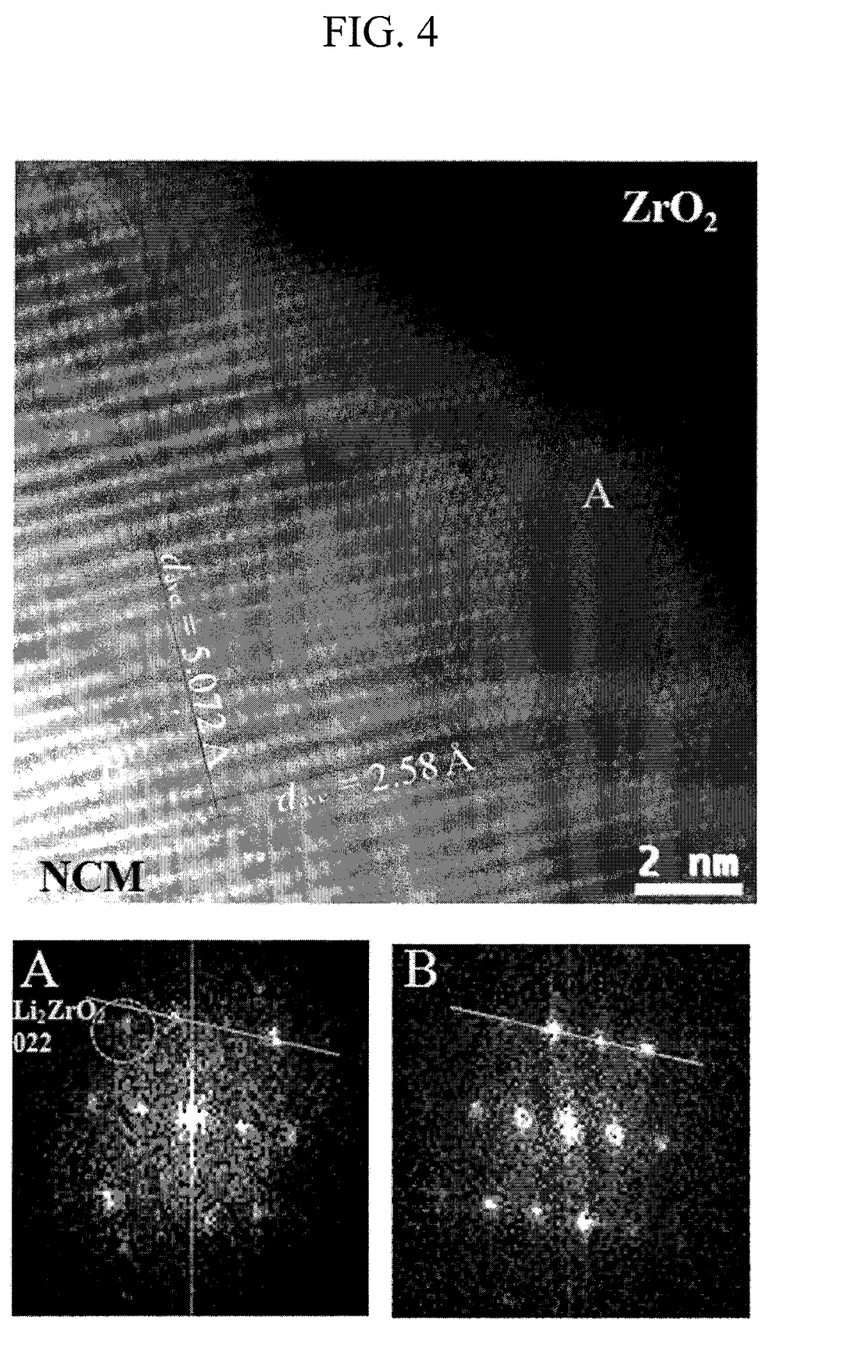
FIG. 4 is a series of transmission electron microscope (TEM) photographs showing the positive active material according to Example 5.

Referring to FIG. 4, $Li_2ZrO_3$ was identified in the TEM photographs of the positive active material according to Example 5.

For example, B in FIG. 4 indicates (or corresponds to) a core part, and A in FIG. 4 indicates (or corresponds to) a boundary between the core and a coating layer. A structural analysis of A and B using a FFT (a fast fourier transform) identifies a $Li_2ZrO_3$ phase, as shown in A, and a layered structure in which atoms were arranged in a straight line, as shown in B.
Manufacture of Rechargeable Lithium Battery Cell 96 wt % of each positive active material according to Examples 1 to 7 and Comparative Examples 1 to 3, 2 wt % of polyvinylidene fluoride (PVDF), and 2 wt % of acetylene black were mixed, and the mixture was dispersed into N-methyl-2-pyrrolidone to prepare a slurry. Subsequently, the slurry was coated on a 10 μm-thick aluminum foil, dried at 135° C. for 3 hours, and compressed to manufacture a positive electrode.

The positive electrode and lithium metal as a counter electrode were used to manufacture a coin-type half-cell. Herein, an electrolyte was prepared by dissolving 1.3M $LiPF_6$ in a mixed solution of ethylene carbonate (EC)/ethylmethyl carbonate (EMC)/diethyl carbonate (DEC) (at a volume ratio of 3:3:4).
Evaluation 4: Cycle-Life Characteristic of Rechargeable Lithium Battery Cell Cycle-life characteristic of each rechargeable lithium battery cell manufactured by respectively using the positive active materials according to Examples 1, 5, and 6 and Comparative Example 1, and the positive active materials according to Example 7 and Comparative Example 3 was evaluated, and the results are provided in FIGS. 5 and 6, respectively.

The rechargeable lithium battery cells were charged and discharged at 0.1 C of current density in the first cycle. A cut-off voltage was 4.3 V during the charge, and a cut-off voltage was 3.0 V during the discharge of the first cycle. Then, the rechargeable lithium battery cells were charged and discharged by sequentially applying current density of 0.2 C, 0.5 C, and 1 C thereto from the second cycle. After the first cycle, a cut-off voltage was 4.3 V during the charge, and a cut-off voltage was 3.0 V during the discharge. Then, the cells were charged and discharged at 1 C, and a cycle-life curved line of the cells was examined.

Figure 5:
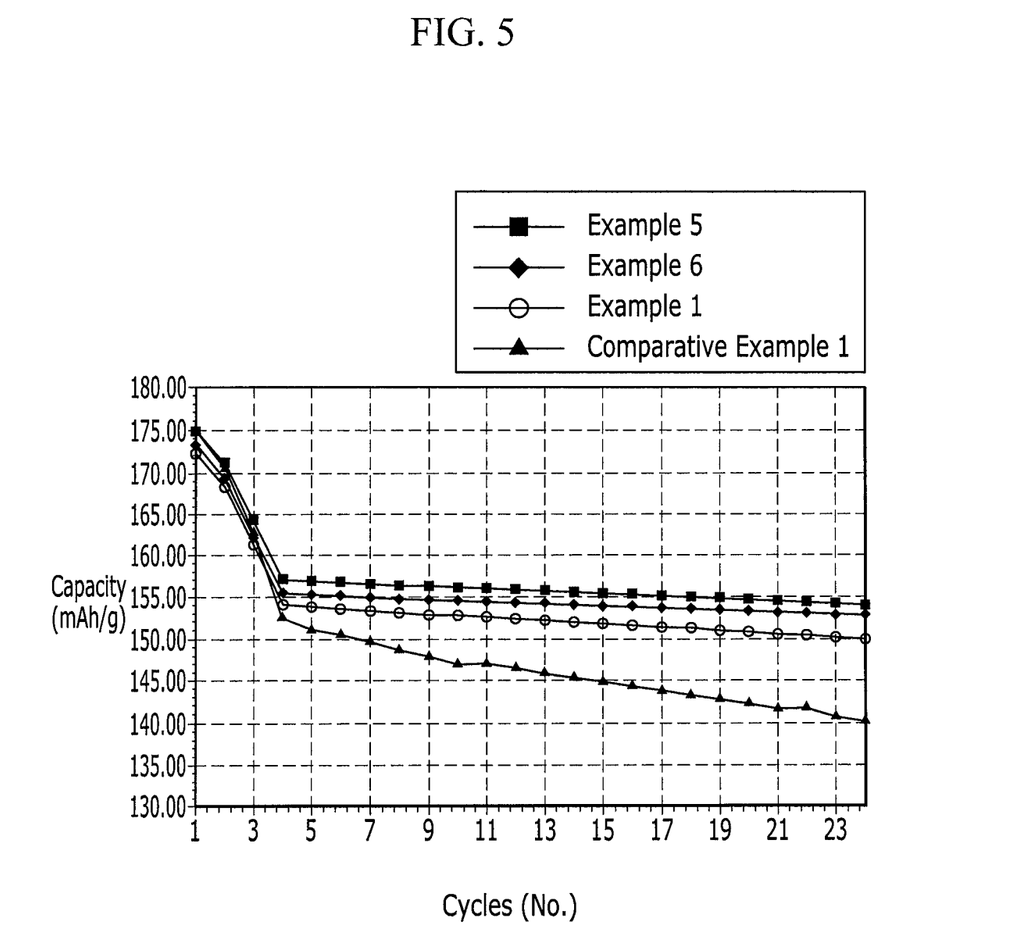
FIG. 5 is a graph showing cycle-life characteristics of rechargeable lithium battery cells according to Examples 1, 5, and 6 and Comparative Example 1.

FIG. 5 is a graph showing cycle-life characteristics of the rechargeable lithium battery cells according to Examples 1, 5, and 6 and Comparative Example 1.

Referring to FIG. 5, Examples 1, 5, and 6, which include a nickel-based composite oxide coated with $Li_2ZrO_3$ as a positive active material showed excellent cycle-life characteristics compared with Comparative Example 1, which included a nickel-based composite oxide that was not coated with $Li_2ZrO_3$.

Figure 6:
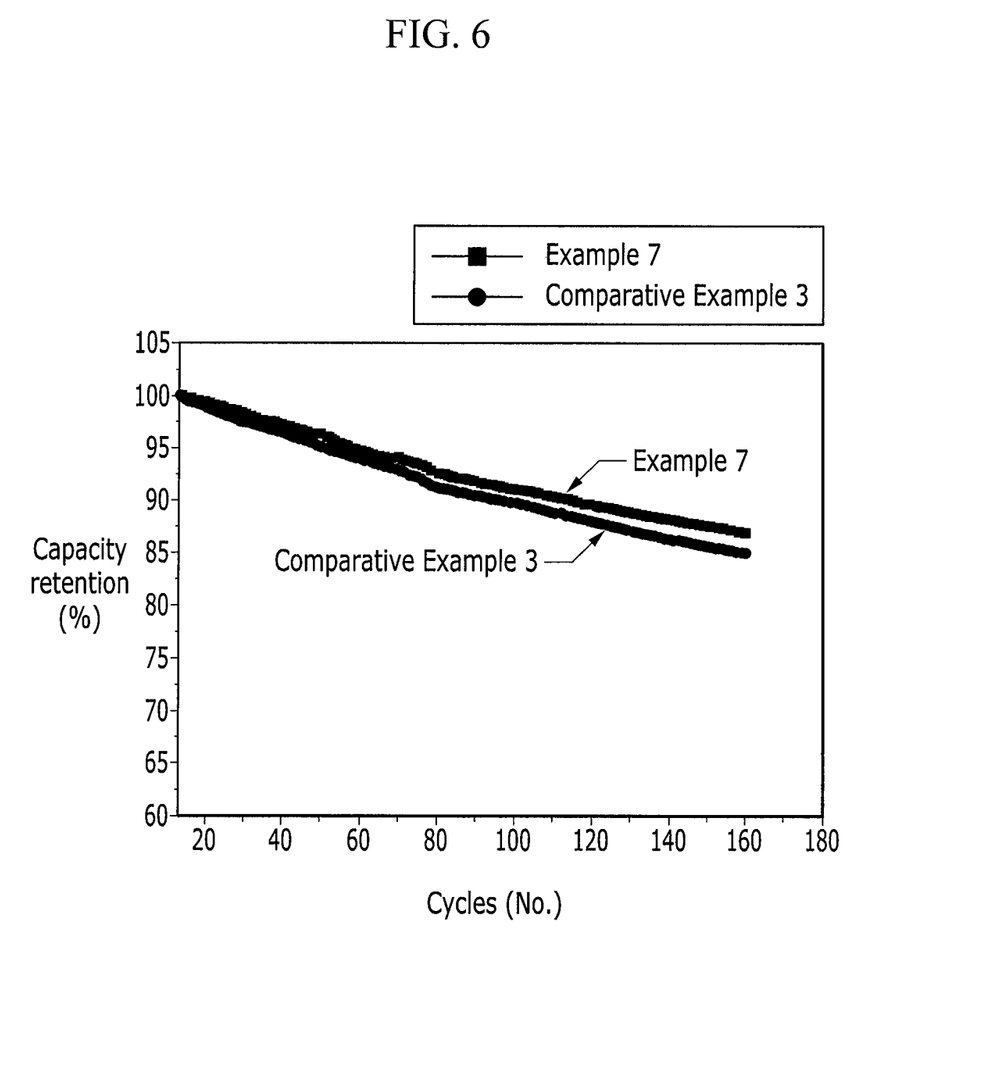
FIG. 6 is a graph showing cycle-life characteristics of rechargeable lithium battery cells according to Example 7 and Comparative Example 3.

FIG. 6 is a graph showing cycle-life characteristics of the rechargeable lithium battery cells according to Example 7 and Comparative Example 3.

Referring to FIG. 6, Example 7, which included a lithium manganese oxide coated with $Li_2ZrO_3$ as a positive active material, showed excellent cycle-life characteristic as compared with Comparative Example 3, which included a lithium manganese oxide that was not coated with $Li_2ZrO_3$.

While this disclosure has been described in connection with what is presently considered to be practical embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A positive active material for a rechargeable lithium battery, comprising:
    a core comprising a nickel-based composite oxide represented by Chemical Formula 1; and
    a coating layer on a surface of the core and comprising a lithium metal oxide represented by Chemical Formula 3,
    wherein the lithium metal oxide represented by Chemical Formula 3 on the surface of the core has a peak at a 2θ value of 20° to about 22° and another peak at a 2θ value of about 40° to about 45° in an X-ray diffraction pattern using a CuKα ray:

$LiNi_xCo_yMn_{1-x-y}O_2$  Chemical Formula 1 wherein 0.56≤x≤0.8, and 0.1≤y≤0.8, and $Li_2MO_3$  Chemical Formula 3 wherein the nickel-based composite oxide represented by Chemical Formula 1 comprises Mn,
    wherein M is Zr,
    wherein the positive active material has an exothermic main peak in a range of 300° C. to 311° C. as measured by differential scanning calorimetry,
    wherein the positive active material has an intensity ratio of the peak at a 2θ value of 20° to about 22° to the other peak at a 2θ value of about 40° to about 45° of about 2.0 to about 3.0, and
    wherein the positive active material is formed using a sol-gel method.

2. The positive active material of claim 1, wherein the positive active material has an intensity ratio of the peak at a 2θ value of about 20° to about 22° to the other peak at a 2θ value of about 40° to about 45° of about 2.0 to about 2.5.

3. The positive active material of claim 1, wherein the positive active material comprises about 98.5 wt % to about 99.9 wt % of the core.

4. The positive active material of claim 1, wherein the positive active material comprises about 0.1 wt % to about 1.5 wt % of the coating layer.

5. A rechargeable lithium battery comprising
    a positive electrode comprising the positive active material according to claim 1;
    a negative electrode; and
    an electrolyte.

* * * * *

UNITED STATES PATENT AND TRADEMARK OFFICE
CERTIFICATE OF CORRECTION

PATENT NO. : 10,868,300 B2  
APPLICATION NO. : 14/281678  
DATED : December 15, 2020  
INVENTOR(S) : Ming-Zi Hong et al.

Page 1 of 1

It is certified that error appears in the above-identified patent and that said Letters Patent is hereby corrected as shown below:

In the Claims  
Column 14, Line 15, Claim 1 delete "2δ" and insert -- 2θ --

Signed and Sealed this  
Fifteenth Day of February, 2022

Drew Hirshfeld  
*Performing the Functions and Duties of the*  
*Under Secretary of Commerce for Intellectual Property and*  
*Director of the United States Patent and Trademark Office*